UNITED STATES PATENT OFFICE.

HERMANN von KÉLER, OF LEVERKUSEN, NEAR COLOGNE, GERMANY, ASSIGNOR TO SYNTHETIC PATENTS CO., INC., OF NEW YORK, N. Y., A CORPORATION OF NEW YORK.

PROCESS FOR PRODUCING THIONYLCHLORID.

1,125,114.      Specification of Letters Patent.      Patented Jan. 19, 1915.

No Drawing.      Application filed September 4, 1913. Serial No. 788,113.

*To all whom it may concern:*

Be it known that I, HERMANN V. KÉLER, doctor of philosophy, chemist, citizen of the German Empire, residing at Leverkusen, near Cologne-on-the Rhine, Germany, have invented new and useful Improvements in Processes for Producing Thionylchlorid, of which the following is a specification.

My invention concerns a new and valuable process for producing thionylchlorid.

My new process consists in treating sulfuric acid anhydrid with sulfur dichlorid at a moderate temperature and in the presence of a suitable catalyzer, such as antimony trichlorid, mercuric chlorid, etc. The process proceeds most probably in accordance with the following equation:

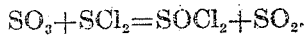

$$SO_3 + SCl_2 = SOCl_2 + SO_2.$$

In order to illustrate my new process more fully the following example is given, the parts being by weight: Into a mixture of 1000 parts of sulfur dichlorid and 10 parts of antimony trichlorid $SbCl_3$ which mixture is in an iron vessel 778 parts of sulfuric acid anhydrid are introduced by distillation at a temperature of 10–15° C. The reaction is complete after 10 hours. Thionylchlorid thus obtained with a good yield is separated from the mixture by a fractional distillation.

I claim:—

1. The process for producing thionylchlorid which comprises treating sulfuric acid anhydrid with sulfur dichlorid at a moderate temperature of about 10° to 15° C. and in the presence of a small amount of a catalyzer, substantially as described.

2. The process for producing thionylchlorid which comprises treating sulfuric acid anhydrid with sulfur dichlorid at a moderate temperature of about 10° to 15° C. and in the presence of antimony trichlorid, substantially as described.

3. The process of producing thionylchlorid which comprises treating sulfuric acid anhydrid with sulfur dichlorid at a temperature of about 10 to 15° C. in the presence of a small amount of a metal chlorid as catalyzer, substantially as described.

4. The process of producing thionylchlorid which comprises treating about 778 parts of sulfuric acid anhydrid with about 1000 parts of sulfur dichlorid at a temperature of 10 to 15° C. in the presence of about 10 parts of antimony trichlorid as catalyzer, substantially as described.

In testimony whereof I have hereunto set my hand in the presence of two subscribing witnesses.

HERMANN von KÉLER. [L. S.]

Witnesses:
 ALBERT NUFER,
 JULIUS FESTNER.